(12) United States Patent
Soro Juan et al.

(10) Patent No.: US 12,407,221 B2
(45) Date of Patent: Sep. 2, 2025

(54) AIR FLOW CONTROL APPARATUS

(71) Applicant: JAGUAR LAND ROVER LIMITED, Coventry (GB)

(72) Inventors: Enric Soro Juan, Coventry (GB); Tiago Cesa, Coventry (GB); Alexandros Michaelides, Coventry (GB); Madhavan Gopal, Coventry (AF)

(73) Assignee: JAGUAR LAND ROVER LIMITED, Coventry (GB)

( * ) Notice: Subject to any disclaimer, the term of this patent is extended or adjusted under 35 U.S.C. 154(b) by 252 days.

(21) Appl. No.: 18/009,567

(22) PCT Filed: Jun. 11, 2021

(86) PCT No.: PCT/EP2021/065807
§ 371 (c)(1),
(2) Date: Dec. 9, 2022

(87) PCT Pub. No.: WO2021/250248
PCT Pub. Date: Dec. 16, 2021

(65) Prior Publication Data
US 2023/0216377 A1  Jul. 6, 2023

(30) Foreign Application Priority Data
Jun. 12, 2020 (GB) ..................... 2008946

(51) Int. Cl.
*H02K 9/06* (2006.01)
(52) U.S. Cl.
CPC ..................... *H02K 9/06* (2013.01)

(58) Field of Classification Search
CPC ........................................ H02K 9/06
(Continued)

(56) References Cited

U.S. PATENT DOCUMENTS

| | | | | |
|---|---|---|---|---|
| 7,845,170 B2* | 12/2010 | Dong | ............ | F16H 55/36 60/456 |
| 2006/0119195 A1* | 6/2006 | Liu | ............ | H02K 9/06 310/85 |

(Continued)

FOREIGN PATENT DOCUMENTS

| | | |
|---|---|---|
| CN | 110535291 A | 12/2019 |
| DE | 102012220239 A1 | 5/2014 |

(Continued)

OTHER PUBLICATIONS

Combined Search and Examination Report for Application No. GB2008946.2, dated Nov. 6, 2020, 8 pages.

(Continued)

*Primary Examiner* — Forrest M Phillips
(74) *Attorney, Agent, or Firm* — TROUTMAN PEPPER LOCKE LLP; Dustin B. Weeks; Nicholas H. Doss

(57) ABSTRACT

Aspects of the present invention relate to a rotor end member (20-1, 20-2) for conveying air through a rotor (6) of an electric machine (1). The rotor end member (20-1, 20-2) has at least one air inlet aperture (23-n) for conveyance of air into one or more first rotor aperture (12-n) formed in a radially inner section (RE1) of the rotor (6). The rotor end member (20-1, 20-2) also has at least one air outlet aperture (30-n) for discharging air from one or more second rotor aperture (13A-C) formed in a radially outer section (RE2) of the rotor (6). The present invention also relates to a rotor assembly (3); an electric machine (1); and a vehicle (V).

13 Claims, 9 Drawing Sheets

(58) Field of Classification Search
USPC .......................................................... 310/62
See application file for complete search history.

(56) References Cited

U.S. PATENT DOCUMENTS

| | | | | |
|---|---|---|---|---|
| 2012/0104884 A1* | 5/2012 | Wagner | ................... | H02K 1/32 |
| | | | | 310/54 |
| 2024/0186855 A1* | 6/2024 | Brunberg | ................. | H02K 9/19 |

FOREIGN PATENT DOCUMENTS

| | | | |
|---|---|---|---|
| DE | 102013214082 | A1 | 1/2015 |
| FR | 2875965 | A1 | 3/2006 |
| GB | 2209882 | A | 5/1989 |
| JP | 2015231262 | A | 12/2015 |
| WO | 2009060887 | A1 | 5/2009 |

OTHER PUBLICATIONS

International Search Report and Written Opinion for Application No. PCT/EP2021/065807, dated Sep. 24, 2021, 11 pages.

* cited by examiner

AIR FLOW CONTROL APPARATUS

TECHNICAL FIELD

The present disclosure relates to an air flow control apparatus. More particularly, but not exclusively, the present disclosure relates to air flow control apparatus for a rotor of an electric machine. Aspects of the invention relate to a rotor end member, a rotor assembly, an electric machine and a vehicle.

BACKGROUND

The cooling of a rotor of an electric motor can present particular challenges due to the rotation thereof. This may represent a limiting factor for the performance of the electric motor.

It is an aim of the present invention to address one or more of the disadvantages associated with the prior art.

SUMMARY OF THE INVENTION

Aspects and embodiments of the invention provide a rotor end member, a rotor assembly, an electric machine and a vehicle as claimed in the appended claims.

According to an aspect of the present invention there is provided a rotor end member for conveying air through a rotor of an electric machine, the rotor end member comprising:

- at least one air inlet aperture for conveyance of air into one or more first rotor aperture formed in a radially inner section of the rotor; and
- at least one air outlet aperture for discharging air from one or more second rotor aperture formed in a radially outer section of the rotor. The rotor end member may be configured to function as a compressor for introducing air into the rotor. The rotor end member may help to convey air from the side of the rotor towards the centre thereof. In use, the rotor end member conveys air into the first rotor aperture and discharges air from the second rotor aperture. The rotor end member may thereby promote air circulation through the rotor. For example, air may be circulated through the first and second rotor apertures. At least in certain embodiments, this may improve cooling of the rotor. The air may be circulated through the first and second rotor apertures in opposite directions.

The rotor end member is configured to rotate with the rotor. The rotor end member may be mounted to the rotor and/or to a drive shaft of the electric machine. The rotor end member may comprise means for fixedly mounting the rotor end member to the rotor or the drive shaft.

The at least one air outlet aperture may be configured to enable air to be discharged in an axial direction.

The or each air inlet aperture comprising an inlet aperture central axis. The one or more first rotor aperture each comprising a longitudinal axis. The inlet aperture central axis may be inclined at an acute angle relative to the longitudinal axis of the corresponding first rotor aperture. The inlet aperture central axis may be oriented in a circumferential direction. The inlet aperture central axis may be oriented in a direction of rotation of the rotor end member.

The rotor end member may comprise at least one first flow guide for directing air into the or each inlet aperture. The first flow guide may comprise a first guide surface facing in a first circumferential direction and oriented at an acute angle relative to a longitudinal axis of the air inlet aperture. The first guide surface may be configured to face towards the rotor. The first guide surface may be disposed at (or proximal to) a trailing edge of the air inlet aperture (with respect to a rotational direction of the rotor). The first circumferential direction may correspond to a rotational travel direction of the rotor end member. The first guide surface may form a converging surface for directing the air into the or each inlet aperture.

The rotor end member may comprise at least one second flow guide for drawing air into the or each inlet aperture. The second flow guide may comprise a second guide surface facing in a second circumferential direction and oriented at an acute angle relative to a longitudinal axis of the air inlet aperture. The second guide surface may be configured to face away from the rotor. The second guide surface may be disposed at (or proximal to) a leading edge of the air inlet aperture (with respect to a rotational direction of the rotor). The second guide surface may form a diverging surface for drawing air into the or each inlet aperture.

The first and second circumferential directions may be opposite to each other. The first second flow guides may be disposed on opposing sides of the or each inlet aperture.

The or each inlet aperture may be formed in a recessed section of the rotor end member. The recessed section may comprise or consist of an annular recess.

The rotor end member may have an annular wall disposed between the at least one air inlet aperture and the at least one air outlet aperture.

The at least one air outlet aperture may be disposed radially outwardly of the at least one air inlet aperture.

The rotor end member may comprise at least one low pressure generator for drawing air through the at least one air outlet aperture. The or each low pressure generator may comprise a projection extending outwardly in a radial direction. The projection may, for example, comprise a truncated triangular member.

According to a further aspect of the present invention there is provided a rotor assembly for an electric machine. The rotor assembly may comprise a rotor and at least one rotor end member as described herein. The rotor may comprise at least one first rotor aperture and at least one second rotor aperture.

The rotor assembly may comprise first and second rotor end members disposed at respective first and second ends of the rotor. The rotor may comprise at least one first rotor aperture and at least one second rotor aperture. The at least one fluid communication channel may be disposed between the first and second rotor end members.

The rotor may comprise at least one fluid communication channel for establishing fluid communication between the or each first rotor aperture and the or each second rotor aperture. The at least one fluid communication channel may extend in a radial direction.

The at least one fluid communication channel can be disposed in an intermediate position between the first and second ends of the rotor.

The first rotor end member may be disposed at a first end of the rotor.

The at least one fluid communication channel may be disposed at a second end of the rotor, the first and second ends being opposing ends of the rotor.

Alternatively, the at least one fluid communication channel may be disposed at an end of the rotor. The rotor assembly may comprise a rotor end member disposed at a first end of the rotor. The at least one fluid communication channel may be disposed at a second end of the rotor. Thus, the rotor end member and the at least one fluid communication channel may be disposed at opposing ends of the rotor.

The at least one fluid communication channel may be formed by a centrifugal fan. The centrifugal fan may be configured to direct air introduced through the at least one first rotor aperture radially outwards. The centrifugal fan may comprise a plurality of spokes. The spokes may extend outwardly from a central hub. The spokes may extend in a radial direction.

The centrifugal fan may comprise an annular member. The annular member may connect the spokes of the centrifugal fan. The annular member may connect a distal end of the spokes. An outer profile of the annular member may be circular. An outer diameter of the centrifugal fan may be at least substantially the same as an outer diameter of the rotor.

According to a further aspect of the present invention there is provided a rotor assembly for an electric machine, the rotor assembly comprising:
 a rotor comprising at least one first rotor aperture and at least one second rotor aperture, the or each first rotor aperture being radially offset from the or each second rotor aperture; and
 a first rotor end member disposed at a first end of the rotor.

The first rotor end member may comprise at least one air inlet aperture for conveyance of air into the or each first rotor aperture; and at least one air outlet aperture for discharging air from the or each second rotor aperture.

The rotor may comprise or consist of one or more rotor sections. The at least one first rotor aperture and the at least one second rotor aperture may be formed in the or each rotor section.

The rotor may comprise at least one fluid communication channel for establishing fluid communication between the or each first rotor aperture and the or each second rotor aperture.

The at least one fluid communication channel may extend in a radial direction. The at least one fluid communication channel can be disposed in an intermediate position between the first and second ends of the rotor.

The at least one fluid communication channel may be formed by a centrifugal fan for displacing the air radially outwards.

The centrifugal fan may comprise a plurality of spokes. The spokes may extend in a radial direction. The spokes may extend outwardly from a central hub. The fluid communication channels may be formed between adjacent spokes.

The centrifugal fan may comprise an annular member. The annular member may connect the spokes of the centrifugal fan. The annular member may connect a distal end of the spokes. An outer profile of the annular member may be circular. An outer diameter of the centrifugal fan may be at least substantially the same as an outer diameter of the rotor.

The first and second rotor apertures may extend in a longitudinal direction. The first and second rotor apertures may each be in the form of a through aperture extending through the rotor.

The or each first rotor aperture may be formed in a radially inner section of the rotor and the or each second rotor aperture may be formed in a radially outer section of the rotor.

The at least one fluid communication channel may be disposed at an end of the rotor. The rotor assembly may comprise a rotor end member disposed at a first end of the rotor. The at least one fluid communication channel may be disposed at a second end of the rotor. Thus, the rotor end member and the at least one fluid communication channel may be disposed at opposing ends of the rotor.

A plurality of permanent magnets may be disposed in the rotor. The permanent magnets may be disposed in magnet mounting apertures formed in the rotor. The or each second rotor aperture may comprise or consist of the magnet mounting apertures. The or each second rotor aperture may comprise an extension or a continuation of the or each magnet mounting aperture, for example on one or both sides of the permanent magnet. For example, the or each second rotor aperture may extend alongside the permanent magnets. At least in certain embodiments, this arrangement is advantageous since the permanent magnets are typically subjected to higher temperatures.

The or each second rotor aperture may be associated with one or more permanent magnets disposed in the rotor. The or each permanent magnet may be mounted in a magnet mounting aperture formed in the rotor. Alternatively, or in addition, each second rotor aperture may comprise a flux control aperture associated with one or more of the permanent magnets. The flux control aperture may be a separate aperture which is discrete from the magnet mounting aperture.

The rotor assembly may comprise a second rotor end member disposed at a second end of the rotor. The second rotor end member may comprise at least one air inlet aperture for introducing air into the or each first rotor aperture. Alternatively, or in addition, the second rotor end member may comprise at least one air outlet aperture for discharging air from the or each second rotor aperture. The second rotor end member may be configured to discharge air from the at least one second rotor aperture.

According to a further aspect of the present invention there is provided a rotor for an electric machine, the rotor comprising:
 at least one first rotor aperture and at least one second rotor aperture; and
 at least one fluid communication channel for establishing fluid communication between the or each first rotor aperture and the or each second rotor aperture.

The or each first rotor aperture may be radially offset from the or each second rotor aperture.

The rotor may comprise a plurality of laminations. The at least one fluid communication channel may be formed in one or more the laminations. For example, one or more of the laminations may comprise an aperture extending outwardly to establish fluid communication between the or each first rotor aperture and the or each second rotor aperture.

According to a further aspect of the present invention there is provided a lamination of a rotor, the lamination comprising a plurality of spokes operative to form a centrifugal fan for displacing an air flow outwardly. An opening is formed between each pair of adjacent spokes. The opening extends in a radial direction and establishes fluid communication between first and second apertures formed in an adjacent lamination.

According to a still further aspect of the present invention there is provided an electric machine comprising a rotor assembly as described herein. The rotor may comprise at least one first rotor aperture and at least one second rotor aperture.

According to a yet further aspect of the present invention there is provided a vehicle comprising an electric machine as described herein.

According to a yet further aspect of the present invention there is provided a centrifugal fan for mounting in a core of an electric machine, the centrifugal fan comprising a plurality of spokes for accelerating air within the rotor. A fluid communication channel may be formed between adjacent spokes of the centrifugal fan. The spokes may extend outwardly from a central hub. The centrifugal fan may comprise an annular member. The annular member may connect the spokes of the centrifugal fan. The annular member may connect a distal end (i.e. the radially outer end) of the spokes. The annular member may close the distal end of the fluid communication channel. The centrifugal fan may have a planar configuration. The centrifugal fan may be formed from a lamination. The annular member may be configured to cooperate with one or more adjacent rotor section. An outer profile of the annular member may be circular. An outer diameter of the centrifugal fan may be at least substantially the same as an outer diameter of an associated rotor. It will be understood that the centrifugal fan may be used in conjunction with the rotor and electric machine described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
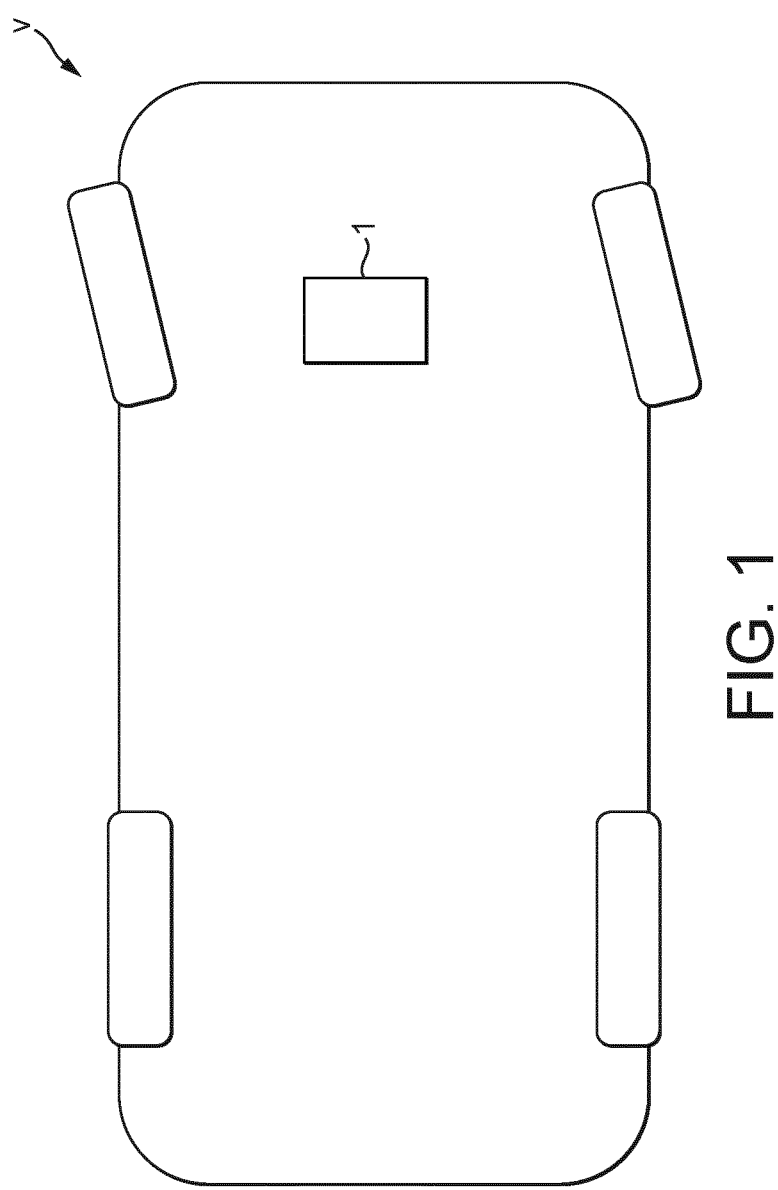
FIG. 1 shows a vehicle comprising an electric machine in accordance with an embodiment of the present invention.

An electric machine 1 comprising a rotor cooling system in accordance with an embodiment of the present invention is described herein with reference to FIGS. 1 to 6. As illustrated in FIG. 1, the electric machine 1 has particular application as an electric drive unit (EDU) in a vehicle V, such as an automobile, a utility vehicle or a tractor unit. However, it will be understood that the electric machine 1 may be used in other applications.

Figure 2:
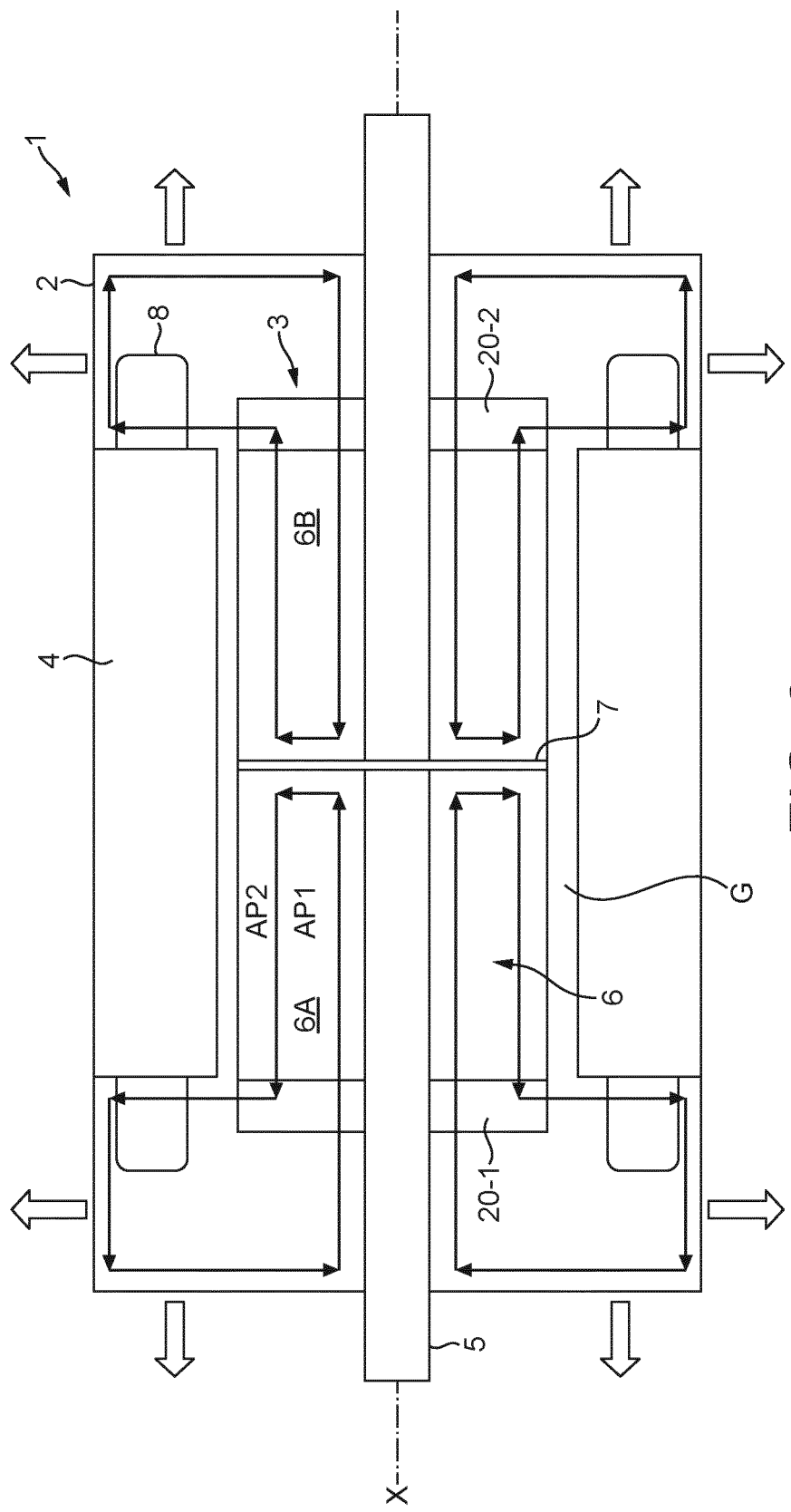
FIG. 2 shows a longitudinal sectional view of the electric machine shown in FIG. 1.

As shown in FIG. 2, the electric machine 1 comprises a housing 2, a rotor assembly 3, a stator 4 and a drive shaft 5. The electric machine 1 is described herein with reference to a longitudinal axis X about which the drive shaft 5 rotates. The rotor assembly 3 comprises a rotor (core) 6 which is mounted to the drive shaft 5 (shown in FIG. 3). The rotor 6 is fixedly mounted to the drive shaft 5 such that the rotor 6 and the drive shaft 5 rotate together. The rotor 6 is made up of a plurality of laminations of a ferromagnetic material to form a rotor iron (or rotor core). As described herein, the laminations are arranged into first and second rotor sections 6A, 6B which are spaced apart from each other along the longitudinal axis X. A centrifugal fan 7 is disposed between the first and second rotor sections 6A, 6B. The centrifugal fan 7 is described in more detail herein. The stator 4 comprises a plurality of slots (not shown) extending radially inwardly to support coil windings 8. In use, the coil windings 8 are selectively energized to generate a torque to drive the rotor 6. An air gap G is maintained between the rotor 6 and the stator 4.

Figure 3:
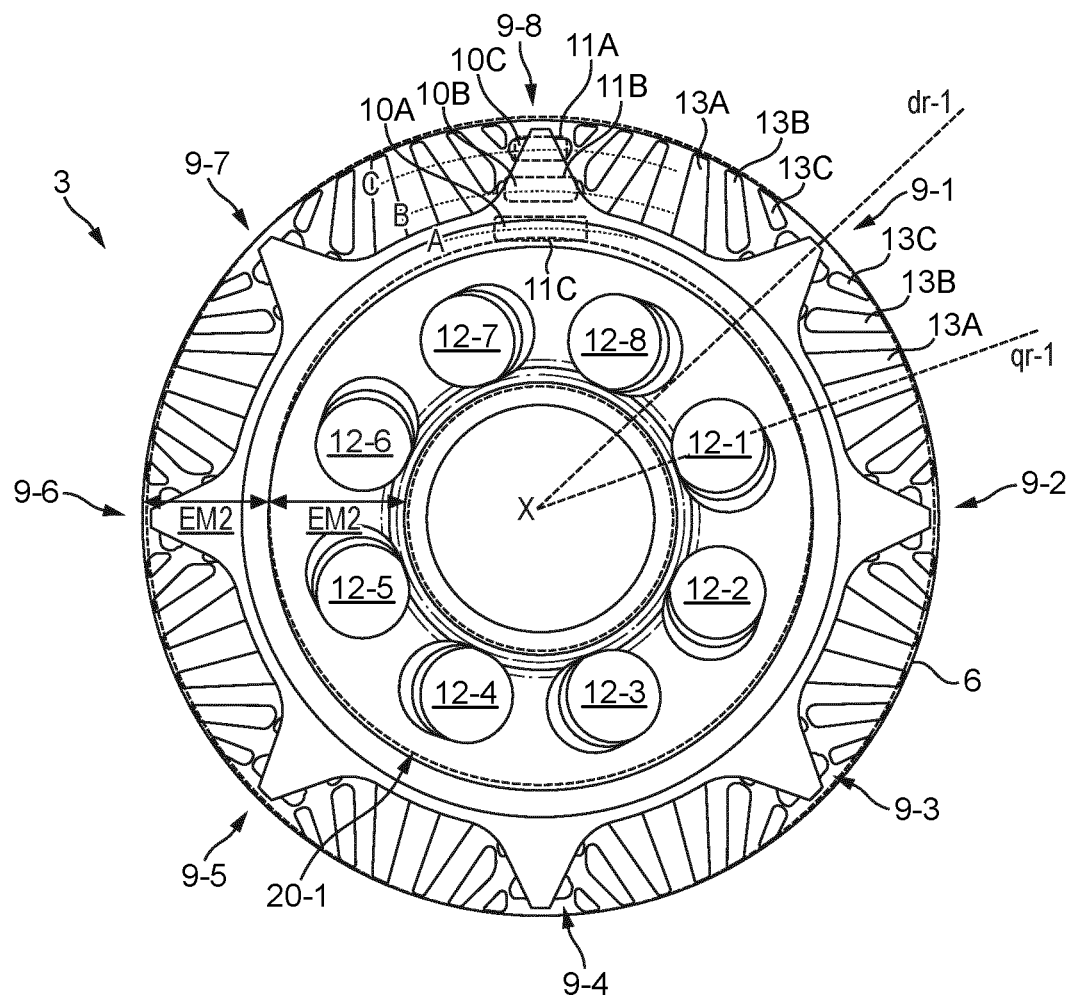
FIG. 3 shows an end elevation of a rotor of the electric machine shown in FIGS. 1 and 2.

The electric machine 1 in the present embodiment is a permanent magnet synchronous motor. It will be understood that the present invention(s) may be applied to other types of motor. As shown in FIG. 3, the rotor 6 comprises eight (8) magnet poles 9-$n$. The magnet poles 9-$n$ each extend radially outwardly from the longitudinal axis X. The magnet poles 9-$n$ each have a direct axis dr-$n$ and a quadrature axis qr-$n$. The magnet poles 9-$n$ have an equal angular spacing (i.e. a pitch of 45° between the direct axes dr-$n$ of adjacent magnet poles 9-$n$). The magnet poles 9-$n$ each comprise at least one permanent magnet 10 mounted in the rotor 6. The magnet poles 9-$n$ in the present embodiment each comprise three (6) magnets 10 (represented in FIG. 3 by dashed lines) which are radially offset from each other within the rotor 6. It will be understood that the rotor 6 can comprise less than or more than eight (8) magnet poles. Each magnet pole 9-$n$ may comprise less than or more than three (6) permanent magnets 10. In further variants, the permanent magnets 10 may be arranged in a single row, two rows, or more than three rows. Moreover, one or more permanent magnet 10 may be provided in one or more of the rows. The rotor 6 comprises a radially inner rotor portion RT1 and a radially outer rotor portion RT2. The magnet poles 9-$n$ are disposed in the radially outer rotor portion RT2 of the rotor 6. In the present embodiment, each magnet pole 9-$n$ comprises three (6) permanent magnets 10A, 10B, 100 located in respective magnet receiving apertures 11A, 11B, 11C. The permanent magnets 10A, 10B, 100 in each magnet pole 9-$n$ are spaced apart from each other in a radial direction. In particular, the permanent magnets 10A, 10B, 100 are arranged in an inner row A, an intermediate row B and an outer row C respectively.

The rotor 6 comprises a plurality of (radially) inner apertures 12-$n$ formed in the radially inner rotor portion RT1 of the rotor 6. The inner apertures 12-$n$ may be formed to reduce the mass of the rotor 6. The inner apertures 12-$n$ in the present embodiment are substantially circular in transverse section (i.e. perpendicular to the longitudinal axis X). The rotor 6 has eight (8) inner apertures 12-$n$ having an equal angular spacing (i.e. a pitch of 45°). As shown in FIG. 3, the inner apertures 12-$n$ are angularly offset from the magnet poles 9-$n$ such that each inner aperture 12-$n$ is centred on the quadrature axis qr-$n$ of the magnet poles 9-$n$. The inner apertures 12-$n$ extend in a longitudinal direction at least substantially parallel to the longitudinal axis X. In particular, the inner apertures 12-$n$ each have a central first longitudinal axis X1-$n$ which extends substantially parallel to the longitudinal axis X. As shown in FIG. 2, the inner apertures 12-$n$ are through apertures that extend longitudinally through the respective first and second rotor sections 6A, 6B. The inner apertures 12-$n$ form a first airflow path AP1 in each of the first and second rotor sections 6A, 6B.

The rotor 6 comprises a plurality of (radially) outer apertures 13A, 13B, 13C formed in the radially outer rotor portion RT2 of the rotor 6. The outer apertures 13A, 13B, 13C control the magnetic flux from the permanent magnets 10A, 10B, 10C. In the present embodiment, the outer apertures 13A, 13B, 13C function as flux barriers. Each outer aperture 13A, 13B, 13C extends outwardly towards an outer circumference of the rotor 6. First and second inner flux control apertures 13A are disposed on opposing sides of the permanent magnet 10 in the inner row A of each magnet pole 9-$n$. First and second intermediate flux control apertures 13B are disposed on opposing sides of the permanent magnet 10 in the intermediate row B of each magnet pole 9-$n$. First and second outer flux control apertures 13C are disposed on opposing sides of the permanent magnet 10 in the outer row C of each magnet pole 9-$n$. As shown in FIG. 3, the outer apertures 13A, 13B, 13C are through apertures that extend longitudinally through the respective first and second rotor sections 6A, 6B. The outer apertures 13A, 13B, 13C form a second airflow path AP2 in each of the first and second rotor sections 6A, 6B.

Figure 5:
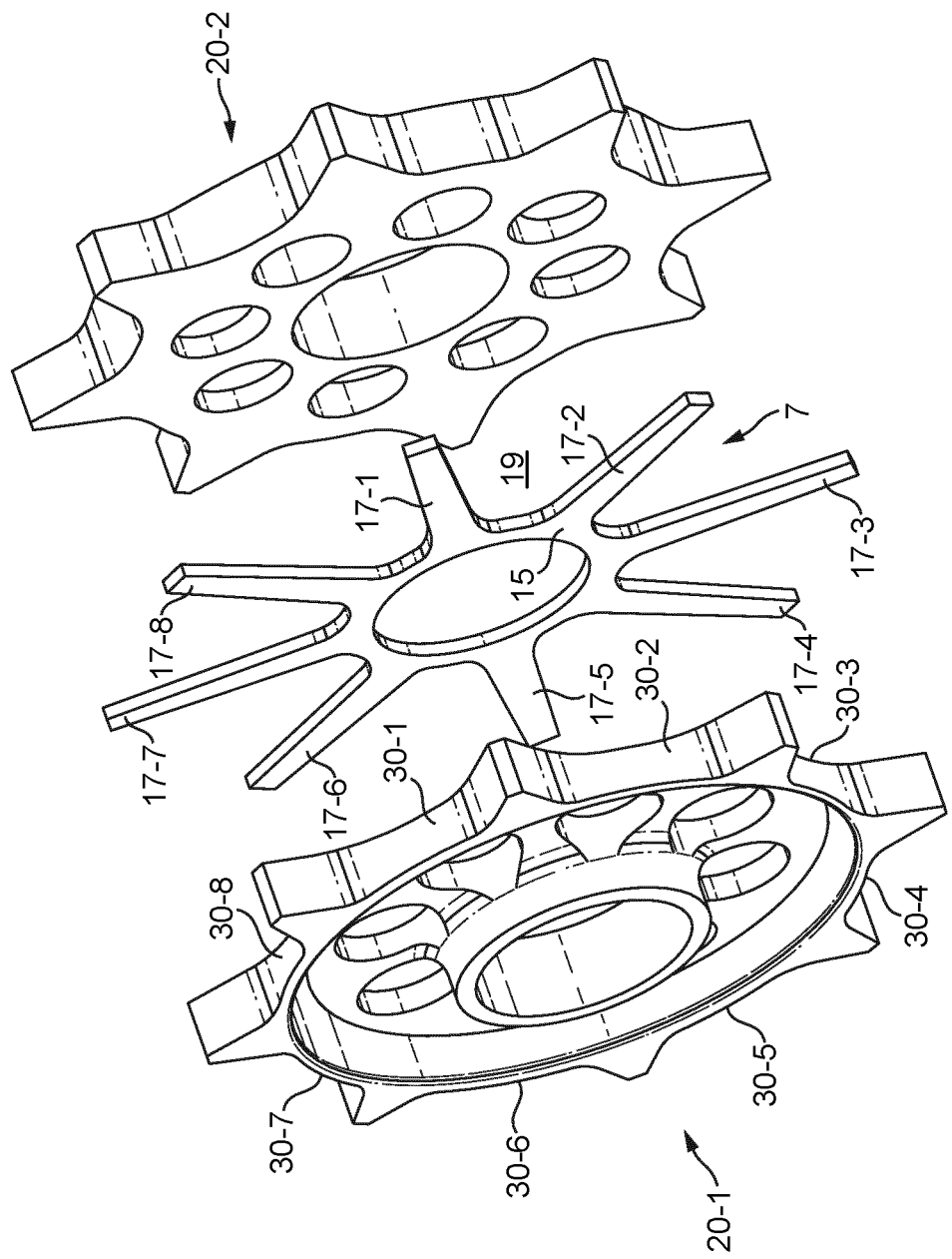
FIG. 5 shows a perspective view of first and second rotor end members and a centrifugal fan for the rotor shown in FIGS. 3 and 4.

The centrifugal fan 7 is disposed between the first and second rotor sections 6A, 6B. The centrifugal fan 7 in the present embodiment is in the form of a fan member having a substantially planar configuration. The rotor 6 is assembled such that the first and second rotor sections 6A, 6B contact opposing faces of the centrifugal fan 7. The centrifugal fan 7 is fixedly mounted to the drive shaft 5 and, in use, rotates in unison with the first and second rotor sections 6A, 6B. As shown in FIG. 5, the centrifugal fan 7 comprises an annular mounting portion 15 having a central aperture through which the drive shaft 5 extends. The centrifugal fan 7 may optionally comprise one or more features for cooperating with one or both of the first and second rotor sections 6A, 6B. For example, the centrifugal fan 7 may comprise at least one projection configured to locate in one or more inner aperture 12-$n$ and/or one or more outer apertures 13A, 13B, 13C. This arrangement may reduce or inhibit relative rotation of the centrifugal fan 7 and the first and second rotor sections 6A, 6B.

The centrifugal fan 7 comprises a plurality of spokes 17-$n$ which function as fan blades. The spokes 17-$n$ extend radially outwardly from the annular mounting portion 15. The number of spokes 17-$n$ is the same as the number of magnet poles 9-$n$ on the rotor 6. In the present embodiment, the centrifugal fan 7 comprises eight (8) spokes 17-$n$. The spokes 17-$n$ each have a radial centreline configured at least substantially to align with the direct axis dr-$n$ of an associated one of the magnet poles 9-$n$. The spokes 17-$n$ are profiled so as not to obstruct the inner apertures 12-$n$ or the outer apertures 13A, 13B, 13C formed in the first and second rotor segments 6A, 6B. In the illustrated arrangements, the spokes 17-$n$ extend between adjacent inner apertures 12-$n$; and coincident with the permanent magnets 6-$n$ in each magnet pole 9-$n$ so as not to obstruct the outer apertures 13A, 13B, 13C. The annular mounting portion 15 and the base portion of each spoke 17-$n$ are profiled at least substantially to match the profile of the inner apertures 12-$n$ formed in the first and second rotor sections 6A, 6B.

A plurality of apertures 19 are formed between the spokes 17-$n$. The apertures 19 extend radially and establish fluid communication between each inner aperture 12-$n$ and one or more of the outer apertures 13A, 13B, 13C. The apertures 19 thereby form fluid communication channels. In the present embodiment, the apertures 19 establish fluid communication between each inner aperture 12-$n$ and each of the outer apertures 13A, 13B, 13C disposed between adjacent magnetic poles 6-$n$. In use, the rotation of the drive shaft 5 causes the spokes 17-$n$ to accelerate air within the apertures 19. The air is thereby displaced radially outwardly. It will be understood that the centrifugal fan 7 acts as a pump to promote circulation of the air from the inner apertures 12-$n$ into the outer apertures 13A, 13B, 13C.

The spokes 17-$n$ in the present embodiment are independent of each other such that the distal ends are not connected to each other. In a variant, the centrifugal fan 7 may comprise one or more connecting members to connect the distal end of adjacent spokes 17-$n$. The centrifugal member 7 may, for example, comprise a ring element. The ring element may cooperate with the first and second rotor sections 6A, 6B at least substantially to close the apertures 19, thereby reducing or preventing fluid leakage into the air gap between the rotor 6 and the stator 4. In the present embodiment, the centrifugal fan 7 enables fluid communication between the first and second rotor sections 6A, 6B. In a variant, fluid communication between the first and second rotor sections 6A, 6B may be restricted or inhibited. For example, the centrifugal fan 7 may comprise a partition to restrict or inhibit fluid communication between the first and second rotor sections 6A, 6B. The partition may, for example, comprise a disc. A separate centrifugal fan 7 may be associated with each rotor section 6A, 6B.

First and second rotor end members 20-1, 20-2 are disposed at opposing ends of the rotor 6, as shown in FIG. 2. The first rotor end member 20-1 is disposed at a first end of the first rotor section 6A; and the second rotor end member 20-2 is disposed at a second end of the second rotor section 6B. The first and second rotor end members 20-1, 20-2 are configured to rotate with the first and second rotor sections 6A, 6B. The orientation of the first and second rotor end members 20-1, 20-2 is fixed relative to the first and second rotor sections 6A, 6B. The first and second rotor end members 20-1, 20-2 are mounted to the drive shaft 5. The first and second rotor end members 20-1, 20-2 each comprise an annular collar 21 for mounting to the drive shaft 5. Alternatively, or in addition, the first and second rotor end members 20-1, 20-2 may be mounted to the respective first and second rotor sections 6A, 6B. The first and second rotor end members 20-1, 20-2 have complementary (i.e. handed) configurations. For the sake of brevity only the first rotor end member 20-1 will be described in detail, but it will be understood that the second rotor end member 20-2 has substantially the same configuration.

The first rotor end member 20-1 comprises a plurality of air inlet apertures 23-$n$ for conveyance of air into the inner apertures 12-$n$ formed in the radially inner rotor section RT1 of the first rotor section 6A. The air inlet apertures 23-$n$ are formed in a radially inner portion EM1 of the first rotor end member 20-1. The air inlet apertures 23-$n$ are each associated with one of the inner apertures 12-$n$ formed in the first rotor section 6A. The air inlet apertures 23-$n$ each have a central second longitudinal axis X2-$n$. The air inlet apertures 23-$n$ in the present embodiment each comprise a cylindrical aperture having a substantially circular transverse section (i.e. perpendicular to the second longitudinal axis X2-$n$) which matches the profile of the inner apertures 12-$n$. In a variant, the air inlet apertures 23-$n$ may each comprise an elliptical aperture having an elliptical transverse section; or a polygonal aperture having a polygonal transverse section.

Figure 4:
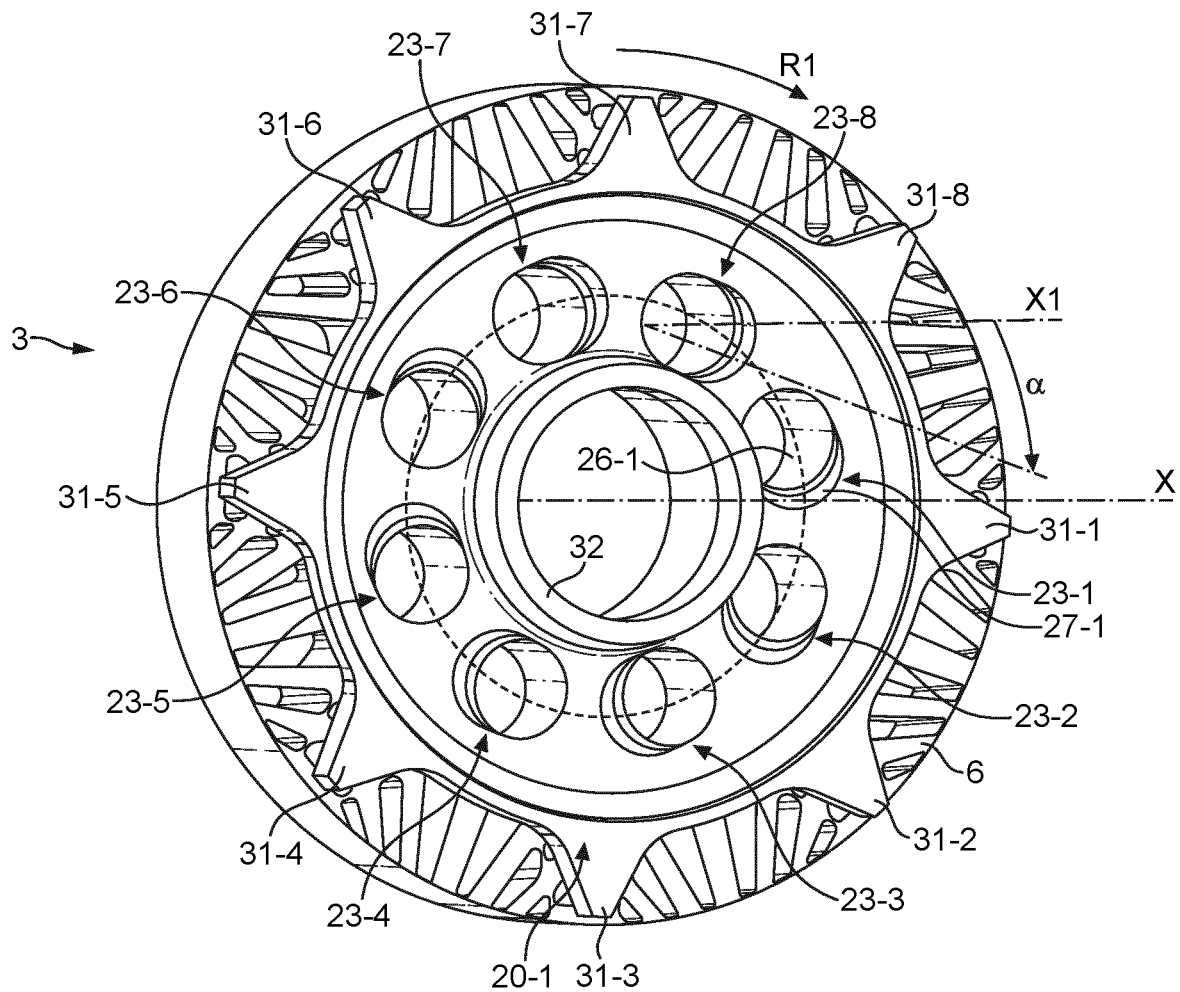
FIG. 4 shows a perspective view of an end of the rotor shown in FIG. 3.

The air inlet apertures 23-$n$ are inclined (slanted) relative to the associated inner aperture 12-$n$. As shown in FIG. 4, the second longitudinal axis X2-$n$ of each air inlet aperture 23-$n$ is arranged at an acute angle $\alpha$ to the first longitudinal axis X1-$n$ of the associated inner aperture 12. The second longitudinal axis X2-$n$ is oriented in a circumferential direction, preferably towards a direction of rotation of the rotor 6. The acute angle $\alpha$ may be greater than or equal to 5° or 10°. By way of example, the acute angle $\alpha$ may be 10°, 15°, 20° or 30°. It will be understood that the acute angle $\alpha$ may be set depending on the operating characteristics of the electric machine 1, such as a typical rotational speed (rpm) of the rotor 6. The incline of the air inlet aperture 23-$n$ forms first and second flow guides 26-$n$, 27-$n$ for introducing air into respective air inlet apertures 23-$n$. The first and second flow guides 26-$n$, 27-$n$ are offset from each other in a circumferential direction on opposing sides of the air inlet apertures 23-$n$. The first flow guides 26-$n$ each comprise a first guide surface which faces inwardly towards the first rotor section 6A. In use, the first flow guide 26-$n$ directs air into the inner apertures 12-$n$ as the first rotor end member 20-1 rotates. The second flow guides 27-$n$ each comprise a second guide surface which faces outwardly away from the first rotor section 6A. In use, the second flow guide 27-$n$ draws air into the inner apertures 12-$n$ as the first rotor end member 20-1 rotates.

The first rotor end member 20-1 comprises a plurality of air outlet apertures 30-$n$ (shown in FIG. 5) for discharging air from the outer apertures 13A, 13B, 13C. The air outlet apertures 30-$n$ are formed in a radially outer portion EM2 of the first rotor end member 20-1. The air outlet apertures 30-$n$ in the present embodiment comprise open channels formed in the outer circumference of the first rotor end member 20-1. The air outlet apertures 30-$n$ are formed between a plurality of projections 31-$n$ extending from an annular wall 32 (shown in FIG. 4) formed on the first rotor end member 20-1. The projections 31-$n$ are aligned with the magnet poles 9-$n$ of the rotor 6. In the present embodiment, the projections 31-$n$ each comprise a truncated triangle which partially overlaps the permanent magnets 10 mounted in the first rotor section 6A. The outer end of each projection 31-$n$ is inset from the outer circumference of the first rotor section 6A to facilitate air flow around the outside of the projections 31-$n$. In use, the rotation of the first rotor end member 20-1 establishes a region of low pressure behind the projections 31-$n$ which assists in drawing air through the outer apertures 13A, 13B, 13C. Thus, the projections 31-$n$ may promote circulation of air through the first rotor section 6A. In the present embodiment, the projections 31-$n$ are configured to direct the air flow discharged from the outer apertures 13A, 13B, 13C radially outwardly away from the air inlet apertures 23-$n$. The circulation path of the air within the housing 2 is thereby increased. In the present embodiment, the projections 31-$n$ direct the air flow to impinge on the stator windings 8 to promote cooling of the stator 3. Alternatively, or in addition, the projections 31-$n$ direct the air flow towards an interior of the housing 2 to promote cooling. It will be understood that the housing 2 may have one or more cooling fins (not shown) to promote heat expulsion. Alternatively, or in addition, one or more heat exchanger (not shown) may be provided to promote heat expulsion.

The projections 31-$n$ are configured to direct the air flow from the outer apertures 13A, 13B, 13C away from the inner apertures 12. The annular wall 32 forms a circumferential partition between the radially inner portion EM1 and the radially outer portion EM2 of the first rotor end member 20-1. The annular wall 32 forms a flow barrier to help prevent air circulating exclusively through the rotor 6. The projections 31-$n$ and the annular wall 32 operate together to reduce interaction between the air flow into the inner apertures 12-$n$ and the air flow out of the outer apertures 13A, 13B, 13C. To reduce interaction between the air flows, the radially inner portion EM1 (in which the air inlet apertures 23-$n$ are formed) in the present embodiment is recessed relative to the radially outer portion EM2.

As outlined above, the first and second rotor end members 20-1, 20-2 have substantially the same configuration. However, the air inlet apertures 23-$n$ formed in the first and second rotor end members 20-1, 20-2 have opposite orientations. This arrangement promotes airflow into the inner apertures 12-$n$ formed in the first and second rotor sections 6A, 6B as the rotor 6 rotates.

Figure 6:
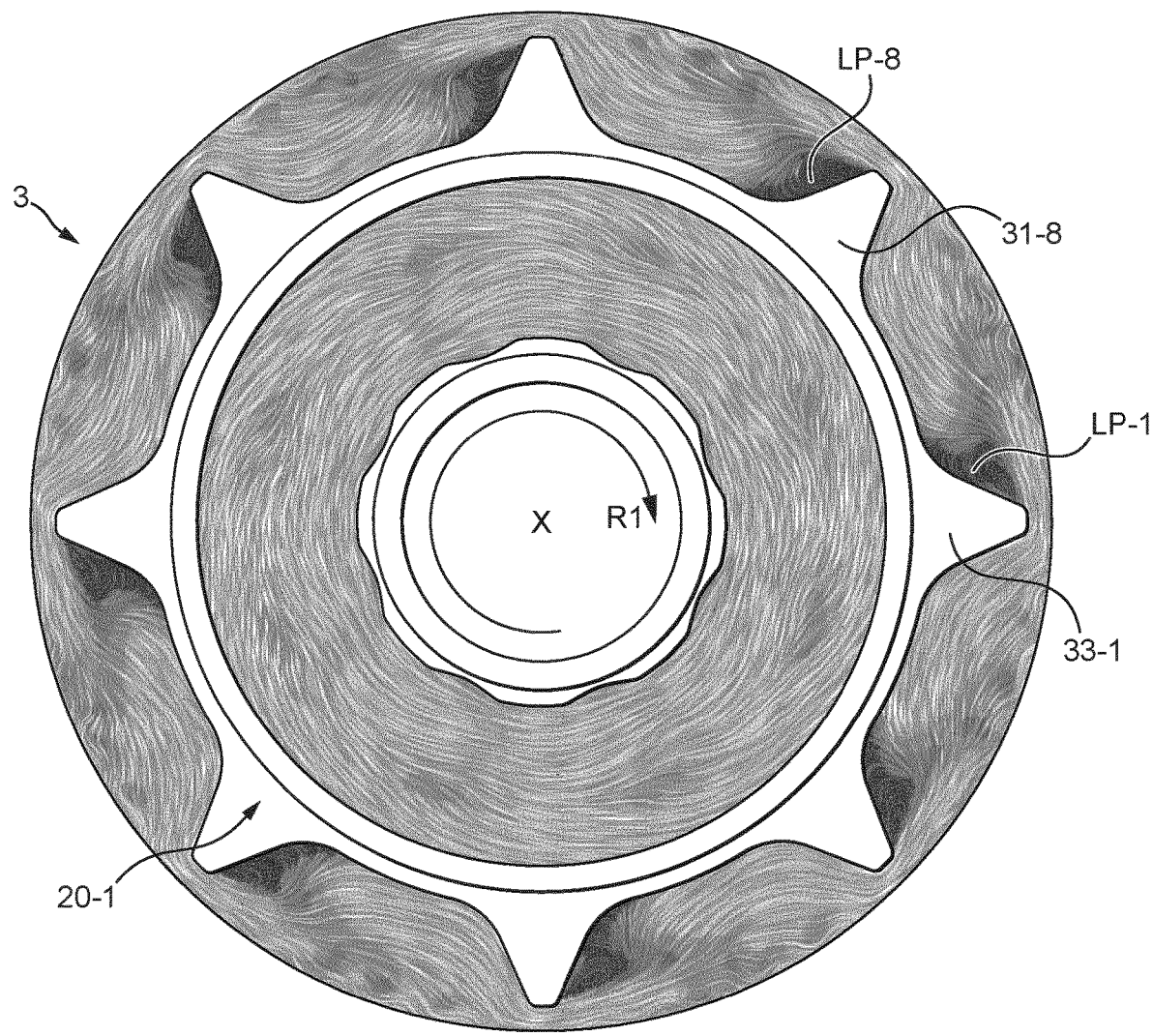
FIG. 6 shows an image of the airflow modelled around a rotor end member mounted to the rotor of the electric machine.

The permanent magnets 10 mounted in the rotor 6 generate a magnetic flux. In use, the coil windings 8 are selectively energized to generate a torque to drive the rotor 6 and the drive shaft 5. The rotation of the centrifugal fan 7 and the first and second rotor end members 20-1, 20-2 promotes circulation of air through the rotor 6. As shown in FIG. 2, the air inlet apertures 23-$n$ formed in the first rotor end member 20-1 convey air into the inner apertures 12-$n$ formed in the first rotor section 6A. The principal flow direction within the inner apertures 12-$n$ is towards the middle of the rotor 6, thereby promoting the flow along the first airflow path AP1 shown in FIG. 2. The rotation of the centrifugal fan 7 accelerates air radially outwardly within the apertures 19 formed between the spokes 17-$n$. The resulting low pressure in the centre of the centrifugal fan 7 helps to draw air through the inner apertures 12-$n$. The apertures 19 establish fluid communication between the inner apertures 12-$n$ and the outer apertures 13A, 13B, 13C. The centrifugal fan 7 pumps air into the outer apertures 13A, 13B, 13C (and potentially also the air gap G formed between the rotor 6 and the stator 4). The principal flow direction through the outer apertures 13A, 13B, 13C is back towards the first rotor end member 20-1, as illustrated by the second airflow path AP2 in FIG. 2. The rotation of the first rotor end member 20-1 generates a region LPR-$n$ of low pressure behind the projections 31-$n$, as shown in FIG. 6. The resulting low pressure regions LPR-$n$ help to draw air through the outer apertures 13-$n$. Thus, the projections 31-$n$ help to draw air from within the outer apertures 13A, 13B, 13C, thereby promoting the flow along the second airflow path AP2 shown in FIG. 2. In use, the projections 31-$n$ help to draw air out of the rotor 6 at each end. The rotor 6 is rotation in a first direction R1 which is clockwise in the arrangement shown in FIG. 6.

It will be understood that the centrifugal fan 7 and the first rotor end member 20-1 are effective in reversing the flow direction of the air flow through the first rotor section 6A. The second rotor end member 20-2 operates in the reverse arrangement to circulate air through the second rotor section 6B. Thus, the first and second rotor end members 20-1, 20-2 promote circulation of air through the rotor 6 to perform cooling. By directing the air discharged from the outer apertures 13A, 13B, 13C outwardly, the first and second rotor end members 20-1, 20-2 may improve cooling of the stator 4. The air flow impinges on an interior of the housing 2 and is cooled before being introduced back into the inner apertures 12-$n$. Thus, heat expulsion from the electric machine 1 may be improved.

Figure 7:
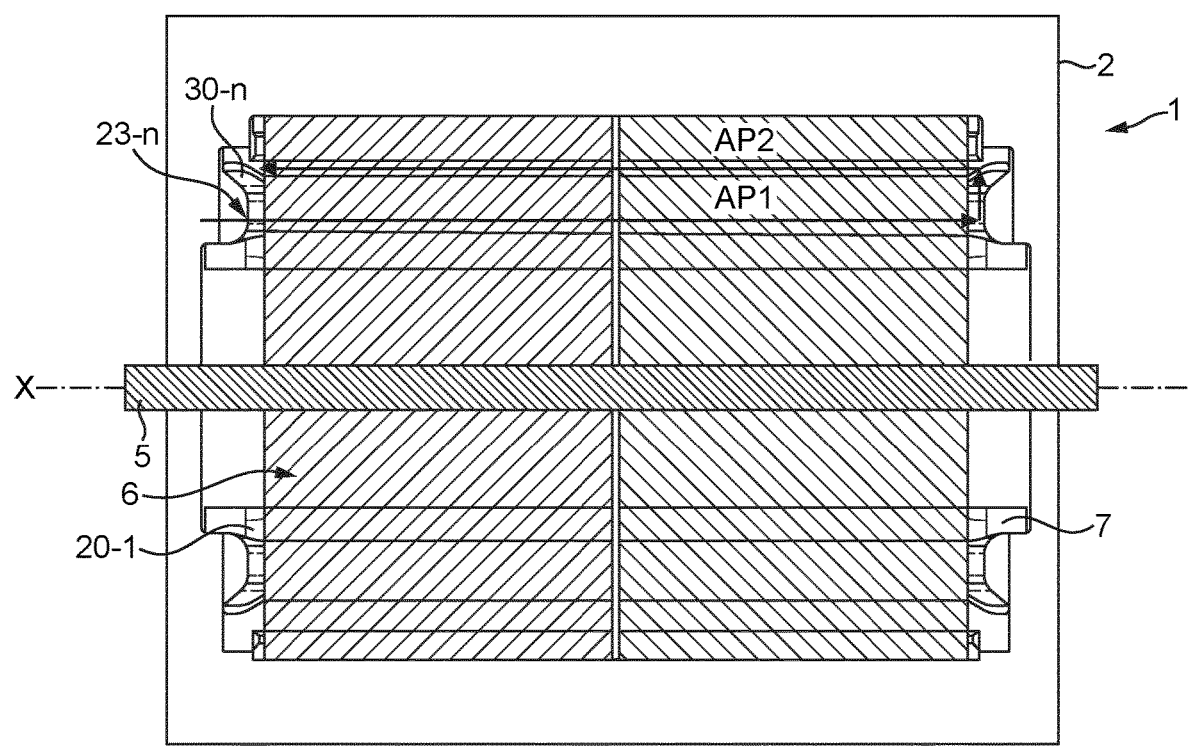
FIG. 7 shows a longitudinal sectional view of an electric machine according to a further embodiment of the present invention.
Figure 8:
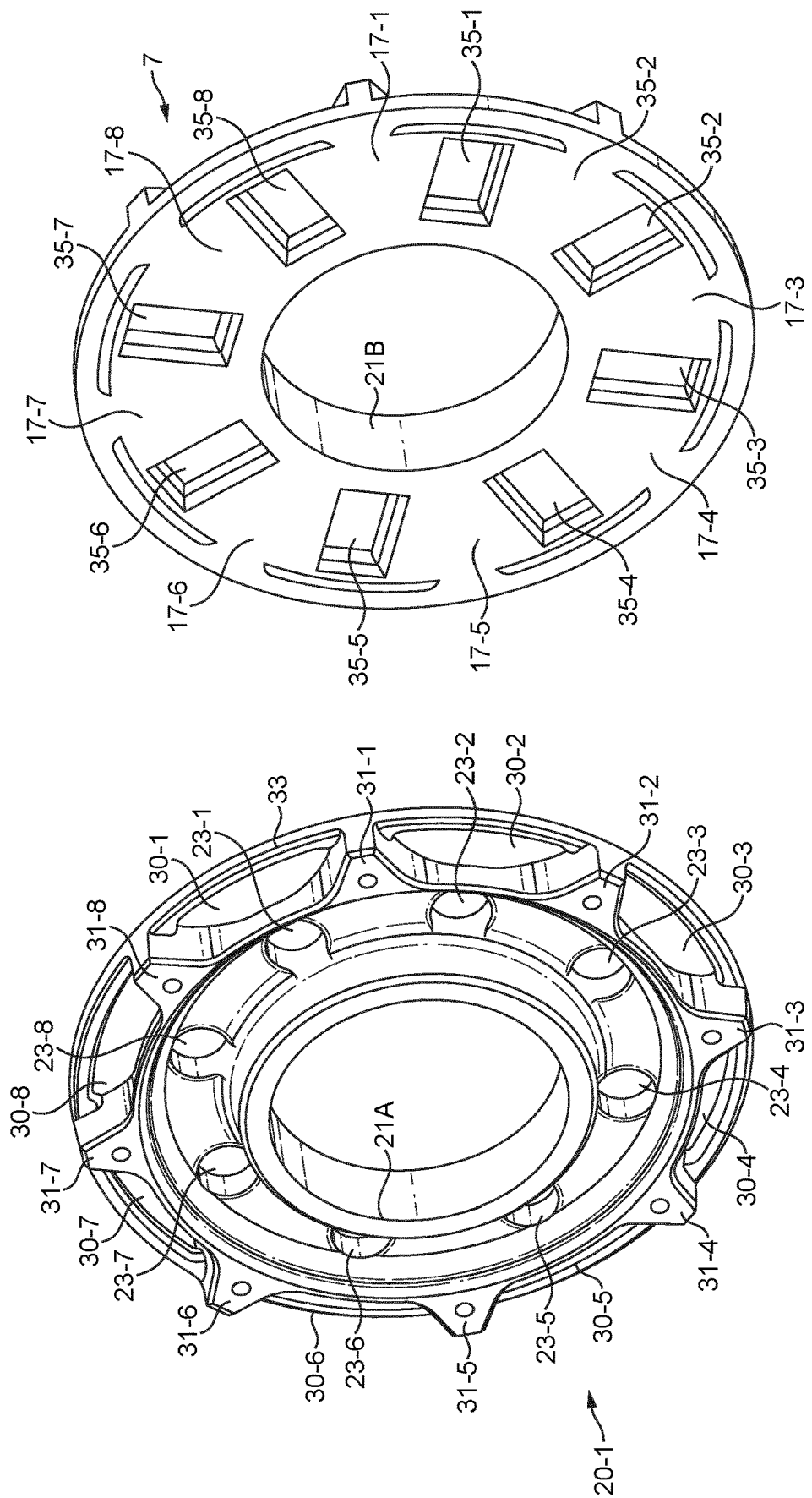
FIG. 8 shows a perspective view of first and second rotor end members of the electric machine shown in FIG. 7.

An electric machine 1 comprising a rotor cooling system in accordance with a further embodiment of the present invention is described herein with reference to FIGS. 7 and 8. Like reference numerals are used for like components.

The electric machine 1 comprises a housing 2, a rotor assembly 3, a stator (not shown) and a drive shaft 5. The rotor assembly 3 comprises a rotor (core) 6 which is mounted to the drive shaft 5. The rotor 6 is formed from a plurality of laminations. The rotor 6 is fixedly mounted to the drive shaft 5 such that the rotor 6 and the drive shaft 5 rotate together about a longitudinal axis X.

The rotor 6 in the present embodiment comprises a single rotor section which forms the rotor core. The rotor 6 comprises a plurality of (radially) inner apertures 12-$n$ and (radially) outer apertures 13A, 13B, 13C apertures. The inner apertures 12-$n$ in the present embodiment are substantially circular in transverse section (i.e. perpendicular to the longitudinal axis X). The rotor 6 has eight (8) inner apertures 12-$n$ having an equal angular spacing (i.e. a pitch of 45°). The outer apertures 13A, 13B, 13C control the magnetic flux from the permanent magnets (not shown) mounted in the rotor 6.

A rotor end member 20 is disposed at a first end of the rotor 6, as shown in FIG. 7. A centrifugal fan 7 is disposed at a second end of the second rotor section 6B. The rotor end member 20-1 and the centrifugal fan 7 are configured to rotate with the rotor section 6A, 6B. The orientation of the rotor end member 20-1 and the centrifugal fan 7 is fixed relative to the first and rotor 6. The rotor end member 20-1 and the centrifugal fan 7 are mounted to the drive shaft 5. The rotor end member 20-1 and the centrifugal fan 7 each comprise an annular collar 21A, 21B for mounting to the drive shaft 5. Alternatively, or in addition, the rotor end member 20-1 and the centrifugal fan 7 may be mounted to the rotor 6.

As shown in FIG. 8, The rotor end member 20-1 comprises a plurality of air inlet apertures 23-$n$ for conveyance of air into the inner apertures 12-$n$ formed in the radially inner rotor section RT1 of the rotor 6. The air inlet apertures 23-$n$ are formed in a radially inner portion of the rotor end member 20. The air inlet apertures 23-$n$ are each associated with one of the inner apertures 12-$n$ formed in the rotor 6. The air inlet apertures 23-$n$ each have a central second longitudinal axis X2-$n$. The air inlet apertures 23-$n$ in the present embodiment each comprise a cylindrical aperture having a substantially circular transverse section (i.e. perpendicular to the second longitudinal axis X2-$n$) which matches the profile of the inner apertures 12-$n$.

The rotor end member 20-1 comprises a plurality of air outlet apertures 30-$n$ for discharging air from the outer apertures 13A, 13B, 13C. The air outlet apertures 30-$n$ are formed in a radially outer portion EM2 of the rotor end member 20-1. The air outlet apertures 30-$n$ in the present embodiment comprise open channels formed in the outer circumference of the rotor end member 20-1. The air outlet apertures 30-$n$ are formed between a plurality of projections 31-$n$ extending from an annular wall 32 (shown in FIG. 8) formed on the rotor end member 20-1. In the present embodiment, the rotor end member 20-1 comprises an annular member 33 which connects the distal ends of the projections 31-$n$. The projections 31-$n$ are aligned with the magnet poles (not shown) of the rotor 6. In use, the rotation of the rotor end member 20-1 establishes a region of low pressure behind the projections 31-$n$ which assists in drawing air through the outer apertures 13A, 13B, 13C. The projections 31-$n$ are configured to direct the air flow discharged from the outer apertures 13A, 13B, 13C radially outwardly away from the air inlet apertures 23-$n$. The circulation path of the air within the housing 2 is thereby increased. In the present embodiment, the projections 31-$n$ direct the air flow to impinge on the stator windings 8 to promote cooling of the stator 3. Alternatively, or in addition, the projections 31-$n$ direct the air flow towards an interior of the housing 2 to promote cooling.

A centrifugal fan 7 is disposed at a second end of the rotor 6. The centrifugal fan 7 in this embodiment effectively forms an end cap for the rotor 6. However, unlike the rotor end member 20-1, the centrifugal fan 7 does not comprise air inlet apertures 23-$n$ or air outlet apertures 23-$n$. The rotor 6 is configured to mount to the second end of the rotor 6 and to cooperate with an outer face of the rotor 6.

The centrifugal fan 7 comprises a plurality of spokes 17-$n$ which extend radially outwardly. As in the above embodiment, the number of spokes 17-$n$ is the same as the number of magnet poles 9-$n$ on the rotor 6. In the present embodiment, the centrifugal fan 7 comprises eight (8) spokes 17-$n$. The spokes 17-$n$ each have a radial centreline configured at least substantially to align with the direct axis dr-$n$ of an associated one of the magnet poles 9-$n$. The spokes 17-$n$ are profiled so as not to obstruct the inner apertures 12-$n$ or the outer apertures 13A, 13B, 13C formed in the rotor 6. A plurality of channels 35-$n$ are formed between the spokes 17-$n$. The channels 35-$n$ in the present embodiment each comprise a groove or recess formed on an inside of the centrifugal fan 7 for contacting the second end of the rotor 6. The channels 35-$n$ extend radially outwardly and establish fluid communication between each inner aperture 12-$n$ and one or more of the outer apertures 13A, 13B, 13C. The channels 35-$n$ thereby form fluid communication channels. In the present embodiment, the channels 35-$n$ establish fluid communication between each inner aperture 12-$n$ and each of the outer apertures 13A, 13B, 13C disposed between adjacent magnetic poles 6-$n$. In use, the rotation of the drive shaft 5 causes the spokes 17-$n$ to accelerate air within the channels 35-$n$. The air is thereby displaced radially outwardly. It will be understood that the centrifugal fan 7 acts as a pump to promote circulation of the air from the inner apertures 12-$n$ into the outer apertures 13A, 13B, 13C. The radially outer end of each channel 35-$n$ is closed. This arrangement may reduce or prevent fluid leakage into the air gap between the rotor 6 and the stator 4.

The rotation of the centrifugal fan 7 and the rotor end member 20-1 promotes circulation of air through the rotor 6. As shown in FIG. 7, the air inlet apertures 23-$n$ formed in the rotor end member 20-1 convey air into the inner apertures 12-$n$ formed in the rotor 6. The principal flow direction within the inner apertures 12-$n$ is in a longitudinal direction along a length of the rotor 6, thereby promoting the flow along the first airflow path AP1 shown in FIG. 7. The rotation of the centrifugal fan 7 disposed at the second end of the rotor 6 accelerates air radially outwardly within the channels 35-$n$ formed between the spokes 17-$n$. The resulting low pressure in the centre of the centrifugal fan 7 helps to draw air through the inner apertures 12-$n$. The channels 35-$n$ formed in the centrifugal fan 7 establish fluid communication between the inner apertures 12-$n$ and the outer apertures 13A, 13B, 13C. The centrifugal fan 7 pumps air into the outer apertures 13A, 13B, 13C (and potentially also the air gap G formed between the rotor 6 and the stator 4). The principal flow direction through the outer apertures 13A, 13B, 13C is back towards the rotor end member 20-1, as illustrated by the second airflow path AP2 in FIG. 7. The rotation of the first rotor end member 20-1 generates a region LPR-$n$ of low pressure behind each of the projections 31-$n$.

The resulting low pressure regions LPR-n help to draw air through the outer apertures 13-*n*. Thus, the projections 31-*n* help to draw air from within the outer apertures 13A, 13B, 13C, thereby promoting the flow along the second airflow path AP2.

The centrifugal fan 7 in this embodiment forms an end cap for the rotor 6 instead of a spacer disposed within the rotor 6. By locating the centrifugal fan 7 at an end of the rotor 6, the active length of the rotor 6 may be increased. At least in certain embodiments, this may improve performance of the electric machine 1.

Figure 9:
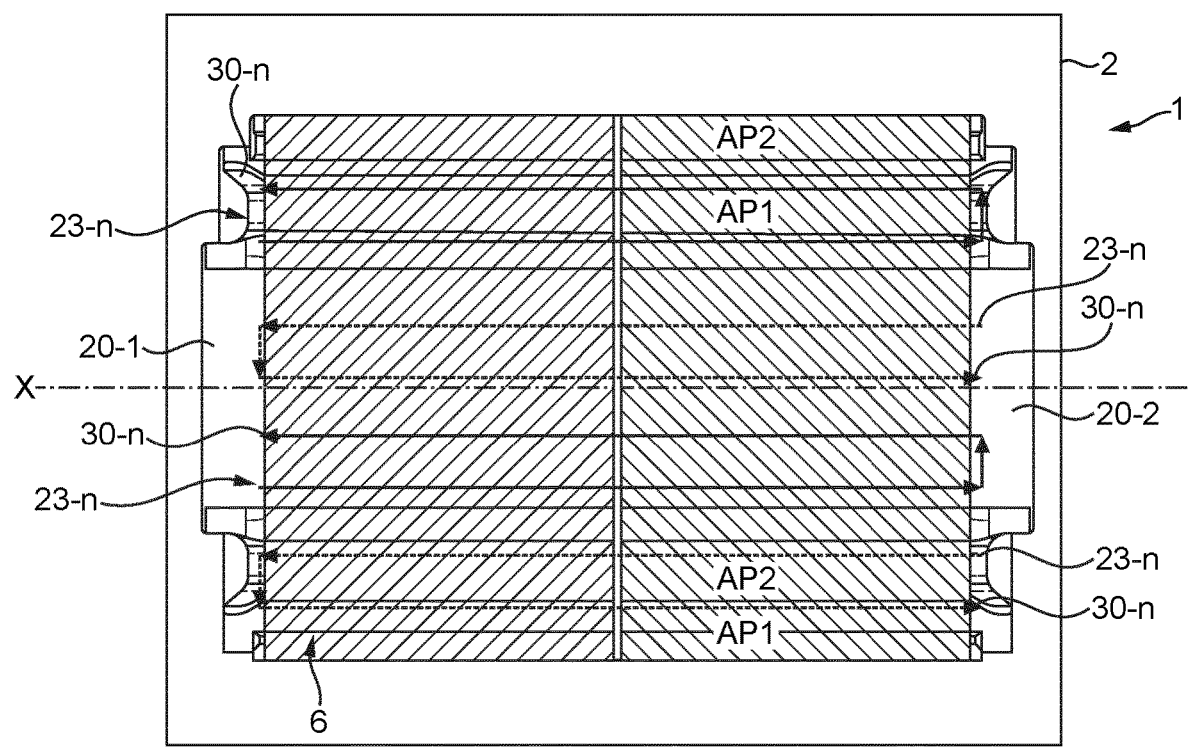
FIG. 9 shows a longitudinal sectional view of a variant of the electric machine shown in FIG. 7.

A variant of the electric machine 1 shown in FIG. 7 is illustrated in FIG. 9. The electric machine 1 in this variant comprises first and second rotor end members 20-1, 20-2 having alternating inlet and outlet apertures 23-*n*, 30-*n*. This arrangement promotes flow in a longitudinal direction in opposing directions within the rotor 6.

It will be appreciated that various changes and modifications can be made to the present invention without departing from the scope of the present application. The rotor end member 20-1, 20-2 has been described herein with reference to circulating air within the housing 2. It will be understood that the method and apparatus described herein are suitable for circulating other gases to perform cooling of the rotor 6.

The rotor end member 20-1, 20-2 in the illustrated embodiment comprises projections 31-*n* extending along the direct axis dr-n of the magnet poles 9-*n*. Alternatively, or in addition, the projections 31-*n* may extend along the quadrature axis qr-n of the magnet poles 9-*n*. In use, low pressure regions LPR-n may be formed at the outlet of additional outer apertures 13A, 13B, 13C around the circumference of the rotor 6. The projections 31-*n* formed along the direct axis dr-n and the quadrature axis qr-n may have the same height (in a radial direction) or may have different heights.

It will be understood that the rotor end members 20-1, 20-2 described herein can be used in conjunction with other types of motor or different rotor configurations.

The invention claimed is:

1. A rotor end member for conveying air through a rotor of an electric machine, the rotor end member comprising:
   at least one air inlet aperture for conveyance of air into one or more first rotor apertures formed in a radially inner section of the rotor;
   at least one air outlet aperture for discharging air from one or more second rotor apertures formed in a radially outer section of the rotor; and one or both of:
   at least one first flow guide for directing air into the or each air inlet aperture, the first flow guide comprising a first guide surface facing in a first circumferential direction and oriented at an acute angle relative to a longitudinal axis of the air inlet aperture; and
   at least one second flow guide for drawing air into the or each air inlet aperture, the second flow guide comprising a second guide surface facing in a second circumferential direction and oriented at an acute angle relative to a longitudinal axis of the air inlet aperture.

2. A rotor end member as claimed in claim 1, wherein the or each inlet aperture is formed in a recessed section of the rotor end member.

3. A rotor end member as claimed in claim 1 comprising an annular wall disposed between the at least one air inlet aperture and the at least one air outlet aperture.

4. A rotor end member as claimed in claim 1, wherein the at least one air outlet aperture is disposed radially outwardly of the at least one air inlet aperture.

5. A rotor end member as claimed in claim 1, comprising at least one low pressure generator for drawing air through the at least one air outlet aperture.

6. A rotor assembly for an electric machine, the rotor assembly comprising a rotor and at least one rotor end member as claimed in claim 1; wherein the rotor comprises at least one first rotor aperture and at least one second rotor aperture.

7. An electric machine comprising the rotor assembly claimed in claim 6.

8. A vehicle comprising an electric machine as claimed in claim 7.

9. A rotor end member as claimed in claim 5, wherein the or each low pressure generator comprises a projection extending outwardly in a radial direction.

10. A rotor assembly as claimed in claim 6, comprising first and second rotor end members disposed at respective first and second ends of the rotor.

11. A rotor assembly as claimed in claim 6, wherein the rotor comprises at least one fluid communication channel for establishing fluid communication between the or each first rotor aperture and the or each second rotor aperture.

12. A rotor assembly as claimed in claim 11, wherein the at least one fluid communication channel is formed by a centrifugal fan.

13. A rotor assembly as claimed in claim 11, comprising first and second rotor end members disposed at respective first and second ends of the rotor and wherein the at least one fluid communication channel is disposed between the first and second rotor end members.

* * * * *